United States Patent
Westerberg et al.

(10) Patent No.: US 8,477,653 B2
(45) Date of Patent: Jul. 2, 2013

(54) MONITORING INDIVIDUAL DATA FLOW PERFORMANCE

(75) Inventors: Erik Westerberg, Enskede (SE); Noel Kenehan, Stockholm (SE); Gunnar Bergquist, Kista (SE); Andreas Olsson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 552 days.

(21) Appl. No.: 12/673,468

(22) PCT Filed: Aug. 15, 2007

(86) PCT No.: PCT/SE2007/050553
§ 371 (c)(1), (2), (4) Date: Feb. 12, 2010

(87) PCT Pub. No.: WO2009/022953
PCT Pub. Date: Feb. 19, 2009

(65) Prior Publication Data
US 2011/0222432 A1 Sep. 15, 2011

(51) Int. Cl.
  *H04L 12/26* (2006.01)
  *H04W 4/00* (2009.01)
  *H04W 24/00* (2009.01)
  *H04M 11/00* (2006.01)
  *H04W 80/04* (2009.01)

(52) U.S. Cl.
  CPC ............ *H04L 43/00* (2013.01); *H04W 80/04* (2013.01); *H04M 2215/32* (2013.01); *H04W 24/00* (2013.01)
  USPC ........... 370/253; 370/328; 455/405; 455/423; 455/425

(58) Field of Classification Search
  USPC ................ 370/253, 328; 455/405, 423, 425
  See application file for complete search history.

(56) References Cited

U.S. PATENT DOCUMENTS

| | | | |
|---|---|---|---|
| 2002/0126636 A1* | 9/2002 | Chen | 370/329 |
| 2003/0043802 A1 | 3/2003 | Yazaki et al. | |

(Continued)

FOREIGN PATENT DOCUMENTS

| | | |
|---|---|---|
| EP | 1 783 955 A1 | 5/2007 |
| JP | 2003-078549 | 3/2003 |
| WO | WO 02/37870 A2 | 5/2002 |
| WO | WO 2005/071890 A1 | 8/2005 |

OTHER PUBLICATIONS

International Search Report dated Jun. 13, 2008 (4 pages).

(Continued)

*Primary Examiner* — Paul H Masur

(74) *Attorney, Agent, or Firm* — Myers Bigel Sibley & Sajovec, P.A.

(57) ABSTRACT

The performance of a network, such as a mobile communications network, having multiple network nodes can be monitored. In a first network node, certain data flows passing through the node are tagged by adding a performance management identifier. In a second network node, statistics relating to data flows containing the performance management identifier are aggregated, and the aggregated statistics are reported to a management node of the communications network. This allows for the gathering of accurate statistics relating to specific types of data flow, such as data flows to specific types of user equipment or containing specific types of data, even though the second node, in which the statistics are generated, cannot itself distinguish between the different data flows.

8 Claims, 6 Drawing Sheets

U.S. PATENT DOCUMENTS

| | | |
|---|---|---|
| 2004/0037267 A1 | 2/2004 | Bennett et al. |
| 2005/0130645 A1 | 6/2005 | Dobson et al. |
| 2006/0198359 A1* | 9/2006 | Fok et al. ................. 370/351 |
| 2007/0055789 A1* | 3/2007 | Claise et al. ............... 709/234 |
| 2007/0105544 A1* | 5/2007 | Veres et al. ................ 455/423 |
| 2007/0171052 A1* | 7/2007 | Moriwaki ............... 340/539.22 |
| 2010/0309786 A1* | 12/2010 | Moisand et al. ............ 370/235 |

OTHER PUBLICATIONS

International Preliminary Report on Patentability dated Aug. 25, 2009 (4 pages).

* cited by examiner

MONITORING INDIVIDUAL DATA FLOW PERFORMANCE

CROSS-REFERENCE TO RELATED APPLICATION

This application is a 35 U.S.C. §371 national stage application of PCT International Application No. PCT/SE2007/050553, filed on Aug. 15, 2007, the contents of which are incorporated by reference herein as if set forth in their entirety. The above-referenced PCT International Application was published in the English language as International Publication No. WO 2009/022953 on Feb. 19, 2009.

TECHNICAL FIELD

This invention relates to monitoring the performance of a network, in particular a mobile telecommunications network.

BACKGROUND

For an operator of a mobile telecommunications network, it is important to be able to monitor the performance of the network. Information about the performance of the network can be gathered in the nodes of the network, and reported to an operations and management (O&M) system of the operator.

Typical monitoring systems include counter systems and tracing functions. Counters have a low resolution, in that they aggregate a large amount of information into a single number. For example, a base station can count the total number of dropped calls in a cell, and can then report the result to the O&M system.

SUMMARY

Tracing functions have the highest resolution, in that a large amount of information, for example about a single UE or a single call, can be recorded and sent to the performance management system. Unlike a counter, a tracing function can capture for example when and why a particular UE dropped its calls. The drawback is the amount of information that needs to be communicated from the traffic node to the O&M system. Moreover trace functions scale with the number of users (tracing N users requires N times more info than tracing one user) so that in reality only a small fraction of the mobiles can be traced at any one time, with the result that it become inconvenient to obtain this information about a number of UEs that is large enough to provide statistically significant information about the overall network performance.

Event-based statistics can also be generated, and are intermediate in terms of their resolution and the amount of data sent to the O&M system.

One problem with the available monitoring systems is that, while a counter system can be used to provide information about the overall network performance. it cannot provide information about the performance of the network with regard to particular UE models, or in providing particular services, because the counters provide aggregated statistics. Similarly, tracing functions cannot easily be used to trace sufficiently many mobiles to get reliable statistics, and event-based statistics cannot easily be used because the node that provides the performance monitoring information is not able to distinguish between UE models, or services.

According to a first aspect of the present invention, there are provided methods of monitoring network performance, and network nodes adapted for monitoring the network performance, in accordance with the claims appended hereto.

BRIEF DESCRIPTION OF THE DRAWINGS

For a better understanding of the present invention, reference will now be made, by way of example only, to the accompanying drawings, in which.

DETAILED DESCRIPTION

Figure 1:
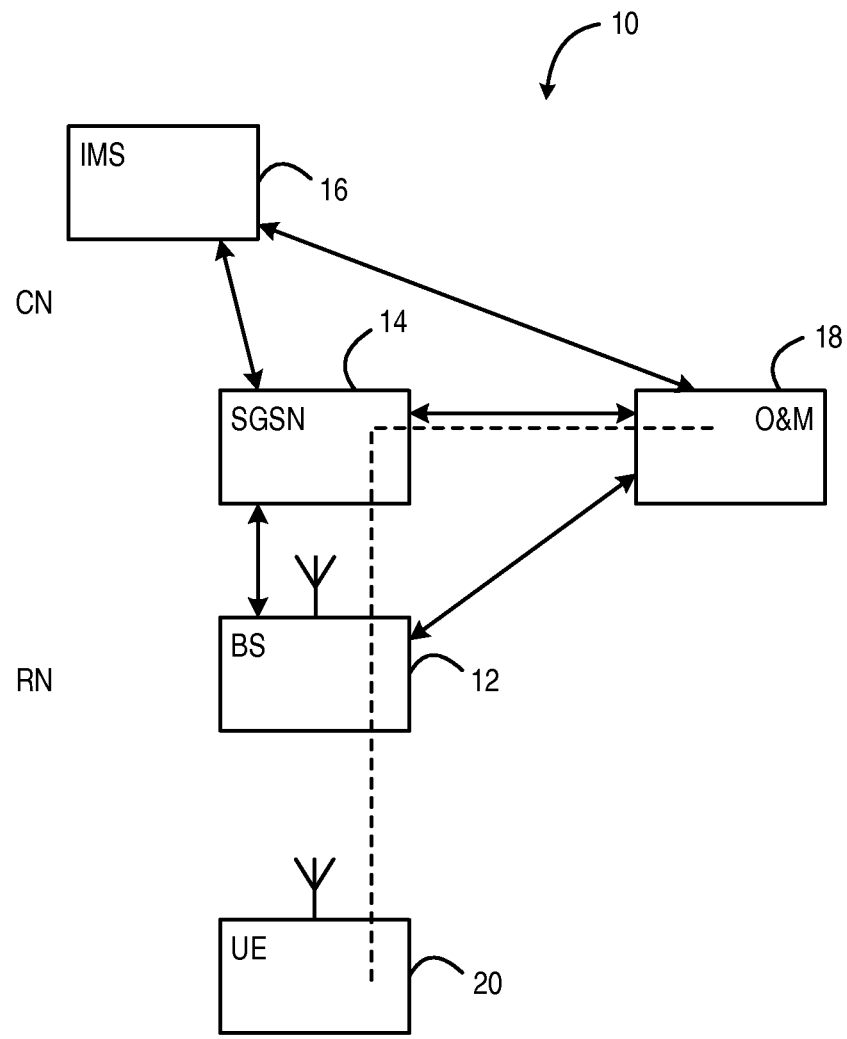
FIG. 1 is a block schematic diagram of a mobile communications network in accordance with an aspect of the present invention.

FIG. 1 illustrates in a simplified form a part of a generally conventional mobile telecommunications network 10. In general terms, the network includes a radio network (RN) comprising multiple network nodes in the form of base stations, of which a single base station (BS) 12 is shown in FIG. 1, although it will be appreciated that an operational network will include many such base stations. Each base station has a connection into a core network (CN) comprising multiple network nodes, of which a SGSN 14 is shown in FIG. 1, although it will be appreciated that an operational network will include more such nodes. The network 10 shown in FIG. 1 also includes an IMS (IP multimedia subsystem) node 16 in the core network, for delivering internet protocol multimedia services (such as IPTV services) to mobile users.

The network architecture shown in FIG. 1 is just one example of a mobile communications network, including different types of network node. It will be appreciated that there are many examples of such network architectures, and the invention can be applied in such other network architectures too.

In this illustrated embodiment, the SGSN 14 has a connection to an operations and management (O&M) node 18, which allows an operator to monitor the network performance and in particular, in this illustrated embodiment of the invention, allows the operator to control the monitoring process.

A user equipment (UE) 20 is located in the coverage area of the base station 12. As is well known, the UE 20 is able to establish a connection to the base station 12 over a wireless interface, and establish a communication path through the mobile communications network with another terminal device.

The O&M node 18 can send commands to, and receive data from, the user equipment 20, base station 12 and SGSN 14, as required, as discussed in more detail below.

Figure 2:
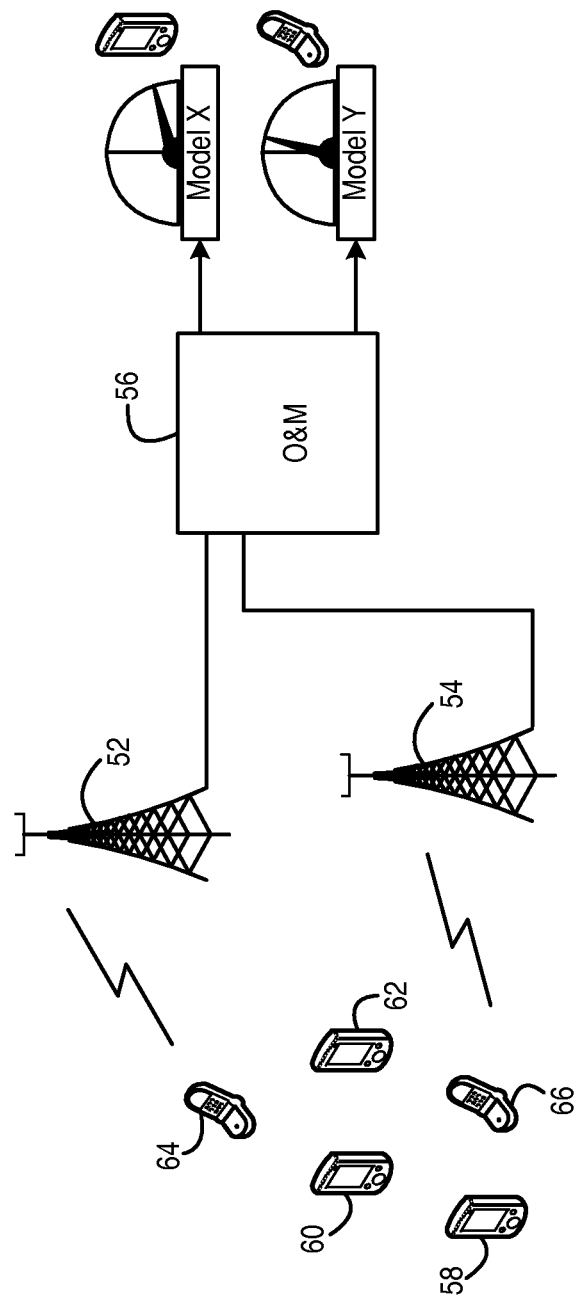
FIG. 2 is a schematic representation of a part of the mobile communications network of FIG. 1.

FIG. 2 represents a part of such a mobile communications network, with multiple base stations 52, 54 connected to an O&M node 56. In this illustrative situation, there are two different types of user equipment in operation in the network, namely UEs 58, 60, 62 which are of a first type, Model X, and UEs 64, 66 which are of a second type, Model Y.

In this illustrative situation, the network operator may for example determine that it wishes to temporarily (for example during a period of one week) measure the performance of a specific mobile type and compare that to the performance of the total terminal population. This may be useful if, for example, an upgrade of the infrastructure leads to worse overall performance and the operator needs to verify/falsify that this is due to problems associated with a certain mobile type.

Figure 3:
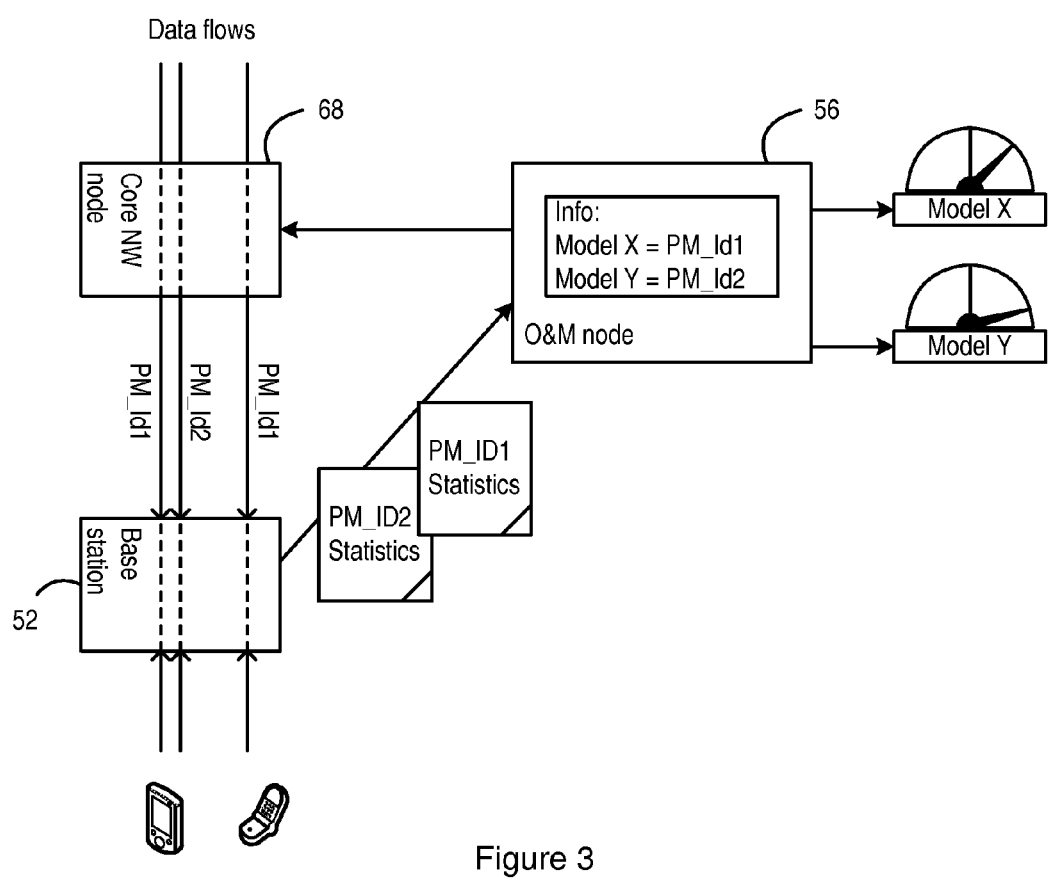
FIG. 3 is a further schematic representation of the part of the mobile communications network of FIG. 2.

FIG. 3 is a schematic representation of the relevant parts of the network involved in the resulting monitoring process, namely a first network node, in this case a core network node, such as a SGSN, 68; a second network node, in this case a base station 52 (it being understood that the same process can be performed in as many of the network base stations as are required); and the O&M node 56.

Figure 4:
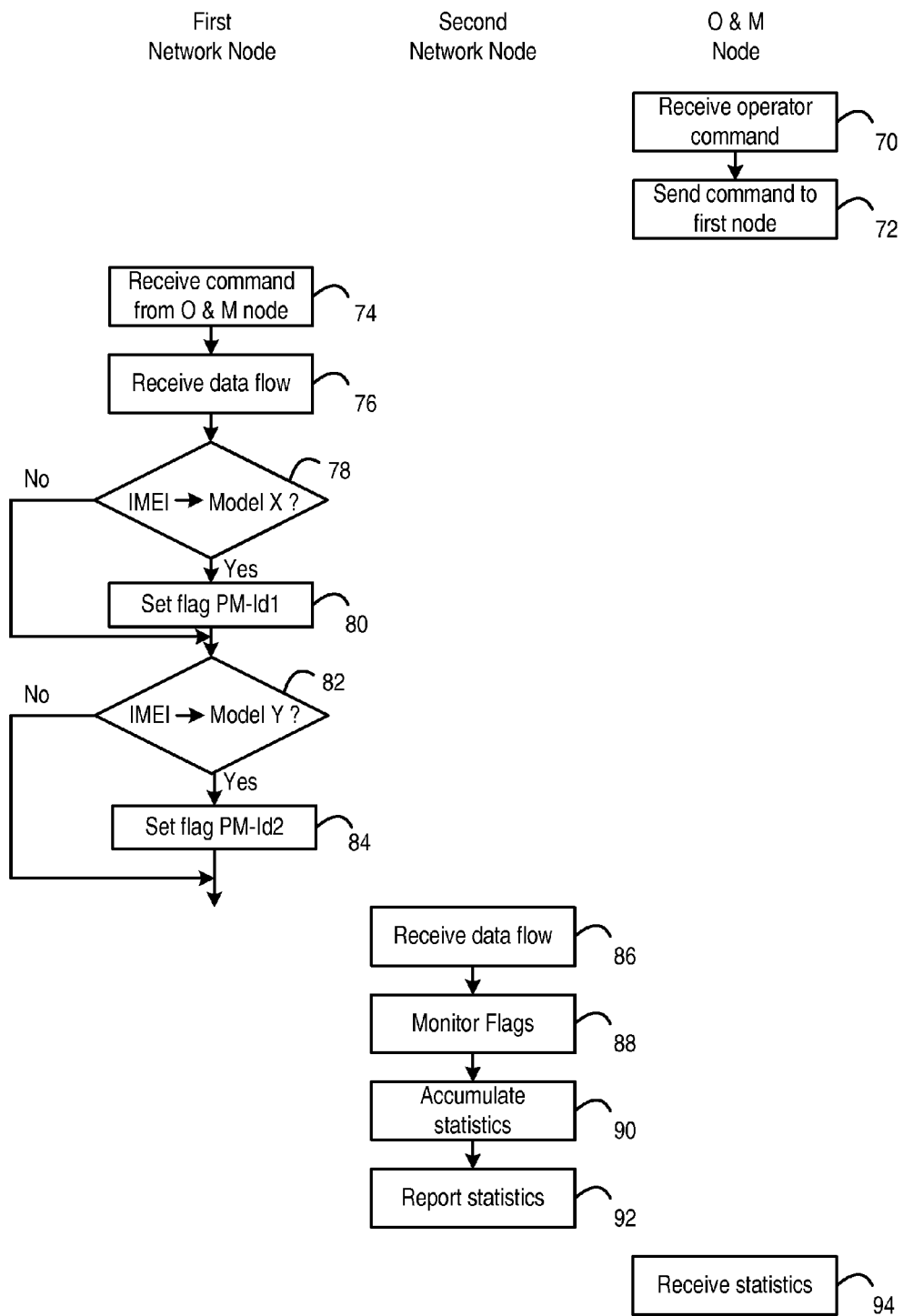
FIG. 4 is a flow chart, illustrating a method in accordance with an aspect of the present invention.

FIG. 4 is a flow chart, illustrating the process performed in the relevant nodes. In step 70, the operator enters a command at the O&M node 56. In this example, as discussed above, the operator requests statistics relating to the performance of the two types of UE, namely Model X UEs and Model Y UEs.

In step 72, the O&M node 56 selects an appropriate first node, and sends an appropriate command to that selected first node. The first node to be selected must be a network node that has information about the operator's designated criterion for distinguishing between all of the network flows. Thus, in this case, the first node to be selected must be a network node that has information about which of the network flows are associated with each of the two types of UE, namely Model X UEs and Model Y UEs. Thus, in this case, the selected first node 68 can be a core network node (such as an SGSN) that is able to determine the IMEI (International Mobile Equipment Identifier) associated with each data flow, and moreover is provided with access to a database that records the manufacturer and model type associated with each IMEI.

As will be described in more detail below, the first network node 68 applies tags to selected data flows, depending on the commands that it receives from the O&M node 56. Preferably, each data flow can be tagged in a standard way. For example, each data flow sent over the network can include a predetermined number of performance monitoring flag bits, and the command sent from the O&M node 56 to the first network node 68 can require that a specifically identified one of those flag bits should be set when the data flow meets the designated criterion.

Thus, in this illustrative example, the O&M node 56 selects a first, currently unused one of the performance monitoring flag bits, indicated in FIG. 3 as PM_Id1, and sends a command to the first network node 68, requiring that this performance monitoring flag bit be set for all data flows to Model X UEs. Also, the O&M node 56 selects a second, currently unused one of the performance monitoring flag bits, indicated in FIG. 3 as PM_Id2, and sends a command to the first network node 68, requiring that this performance monitoring flag bit be set for all data flows to Model Y UEs. The O&M node 56 also stores the associations between the performance monitoring flag bit PM_Id1 and Model X UEs, and between the performance monitoring flag bit PM_Id2 and Model Y UEs.

In step 74, the first network node 68 receives the command or commands from the O&M node 56. Thereafter, as is conventional, the core network node receives a sequence of data flows passing therethrough to the second network node 52, and to the UEs that are active in the network. As shown in FIG. 4, one such data flow is received in step 76.

In step 78, the core network node 68 checks the IMEI of the corresponding mobile. The core network node then looks in its IMEI table and determines whether the mobile is of Model X or not. If the mobile is of Model X, then, in step 80, the core network node 68 tags the corresponding flow with PM-Id1. If the mobile is not of Model X, the process passes to step 82.

In step 82, the core network node 68 determines whether the mobile is of Model Y or not. If the mobile is of Model Y, then, in step 84, the core network node 68 tags the corresponding flow with PM-Id2. Thereafter, or if the mobile is not of Model Y, the core network node 68 continues with its normal processing of the data flow.

This tagging can continue for a prespecified time period, or until such a time as a further command is sent to stop or vary the tagging.

In step 86, a data flow is received in the second network node, in this case the base station 52. In step 88, the second network node monitors whether the flags associated with the data flow have been set.

In step 90, statistics are accumulated in connection with each tagged flow. Thus, separate statistics can be accumulated for all of the data flows to UEs of Model-X, tagged with PM-Id1, and for all of the data flows to UEs of Model-Y, tagged with PM-Id2.

In step 92, the second node creates two performance monitoring files. This step can be performed at the end of a prespecified reporting period, or in response to a specific command, or periodically until such time as a command is sent requesting that the reporting be stopped. The first performance monitoring file is created from performance monitoring statistics relating to data flows tagged with PM-Id1, and the second file is created from performance monitoring statistics relating to data flows tagged with PM-Id2.

The first file contains the identifier PM-Id1 and the second file contains the identifier PM-Id2.

These files are then sent to the O&M system.

Alternatively the second node may create only one performance monitoring file containing all of the information mentioned above. In this alternative the single file should contain a structure such that the O&M system can separate the information associated with the flows tagged with PM_Id1 and PM_Id2 respectively.

In step 94, the O&M node 56 receives the files, or file, and is then able to use the stored information to make deductions about the relative performance of the network in handling data flows to UEs of Model-X, and to UEs of Model-Y.

There is thus illustrated one exemplary embodiment of the invention, in which statistics can be generated in one network node, on the basis of a subset of the data flows, with that subset being determined by the tagging of the data flows in another of the network nodes, on the basis of information that is only available in that other network node.

This principle can be applied in other situations. For example, FIG. 5 illustrates a situation closely related to that shown in FIG. 3, but where the intention is to compare the performance of the network in handling data flows to UEs of Model-X, compared with the overall network performance.

Figure 5:
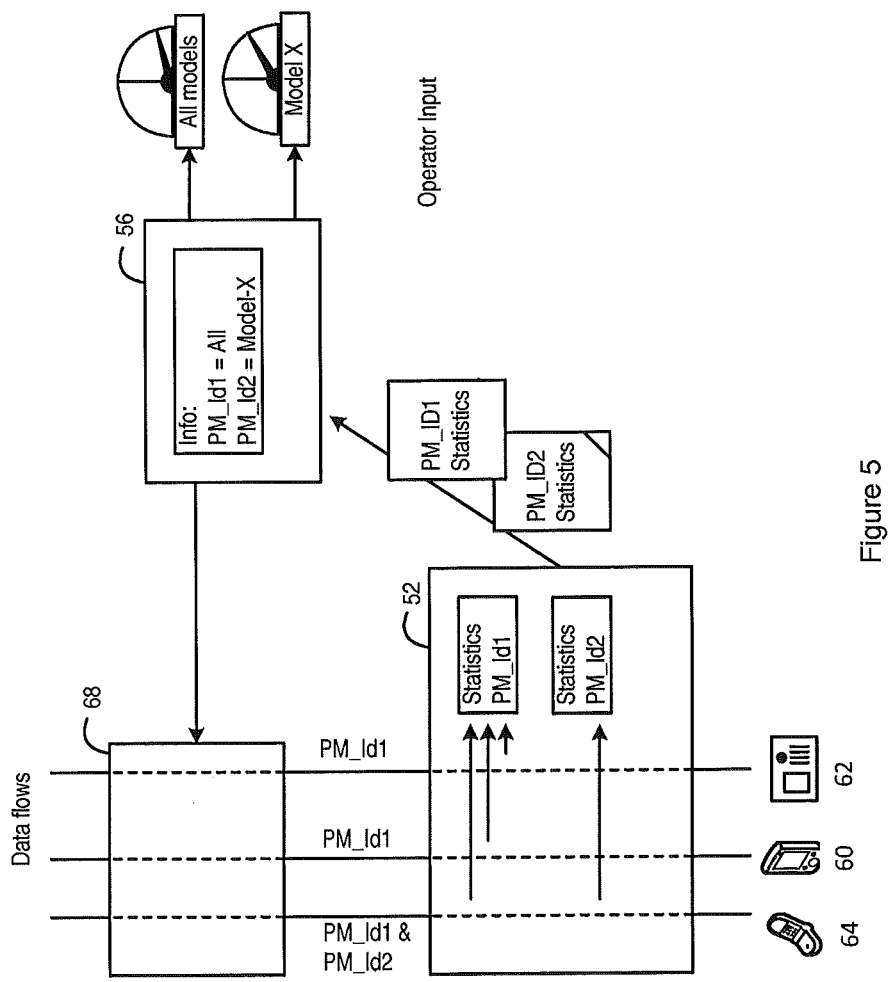
FIG. 5 is a further schematic representation of the part of the mobile communications network of FIG. 2.

Thus, in the situation shown in FIG. 5, the O&M node 56 sends a command to the core network node 68, requiring that the first performance monitoring flag bit PM_Id1 be set for all data flows to all UEs, while the second performance monitoring flag bit PM_Id2 is set for all data flows to Model X UEs.

The result is that, when the base station 52 accumulates the statistics, it sends one file containing accumulated results for all UEs and another file containing results only for Model X UEs, allowing the O&M node 56 to perform the required comparison.

The invention has been described so far with reference to situations where the tagging command is sent to a SGSN or similar core network node, and the statistics are gathered in a radio access node, such as a base station.

Moreover, the invention has been described so far with reference to a situation where the tagging of the flow is performed explicitly, that is, the tagging command is sent from the management node to a first network node, which adds the performance management identifier to the relevant data flows.

However, in other situations, the tagging command may be sent to an intermediate network node that does not itself handle the data flows.

Figure 6:
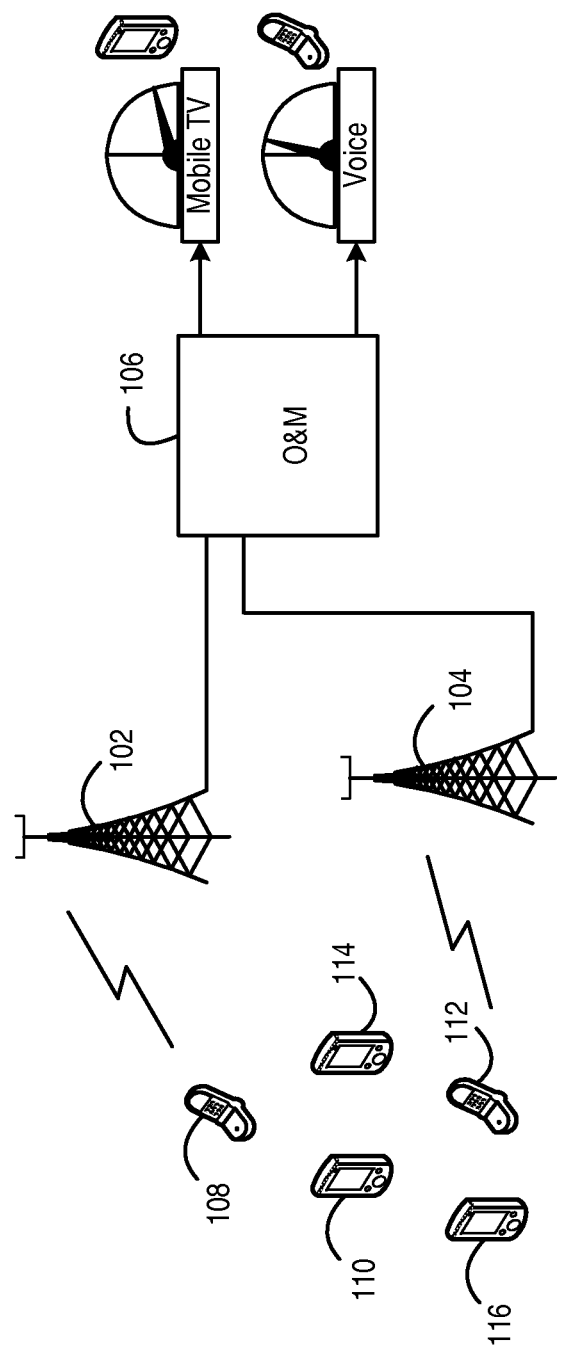
FIG. 6 is a further schematic representation of the part of the mobile communications network of FIG. 1.

FIG. 6 illustrates a situation in which a mobile communications network has multiple base stations 102, 104 connected to an O&M node 106. In this illustrative situation, the network is providing at least two types of service to the user equipments in operation in the network, namely voice services to UEs 108, 110, 112 and mobile TV services to UEs 114 and 116, and to the UE 112, which is also receiving voice services.

In this illustrative situation, the network operator may for example determine that it wishes to measure the performance of the network for users receiving the mobile TV service. As before, counters are insufficient, because they are unable to distinguish between the different services, while trace functions cannot readily be applied to a large enough number of users to obtain statistically robust data.

In accordance with the invention, therefore, the O&M node 18, as shown in FIG. 1, can send a tagging command to the IMS node 16, requiring that all data flows relating to the mobile TV service should be tagged, for example with PM_Id1.

At the initiation of an IPTV service to a particular UE, that UE contacts the IMS node and requests the IPTV service. The IMS node contacts the data source, i.e. the IPTV media services, the GGSN, the SGSN and possibly also other nodes that are going to be involved in the flow. The IMS hence sets up the flow by informing each involved node about the flow and how each node shall handle the flow (e.g. how to prioritize the IPTV media IP packets relative to other IP packets). However, the flow itself (ie. the IP packets carrying the IPTV content) does not go via the IMS node. Rather, the data flow goes along the shortest path from the IPTV media server to the UE (via the GGSN, the SGSN and the RN).

As such, the IMS node that received the command from the O&M node 18 cannot tag the IP packets of the IPTV flow with the performance management identifier. In this case, the implementation of the invention is for the intermediate IMS node to send relevant information to the nodes involved. This information not only informs the nodes how to prioritize the IP PDUs, but also instructs one first node (for example the SGSN 14) to add the performance management identifier PM_Id1, and instructs at least one second node that flows containing this performance management identifier shall be monitored so that the statistics can be aggregated.

The relevant second network node, for example the base station 20. can then accumulate statistics relating to the tagged flows, and can report these to the O&M node 18.

Generally, it will be appreciated that the tagging criterion can be based on any information that is available in the first network node. For example, where the first network node is a core network node, the tagging criterion can be based on different QoS classes, different terminal capabilities, or different subscriptions, amongst other things.

However, it will be appreciated that the first network node, to which the tagging command is sent, could be the base station or other radio access node, if that is the node that has the information to judge whether the data flow meets the intended tagging criterion. For example, the base station could apply a tag to a data flow to indicate that the data flow is being sent over the wireless interface using a particular frequency or spreading code, or is being sent to a cell having a specific cell-id.

Indeed, the first network node, to which the tagging command is sent, could be the user equipment itself, if that is the network element that has the information to judge whether the data flow meets the intended tagging criterion. For example, the user equipment could apply a tag to a data flow to indicate that the data flow is being sent while the UE battery life meets a specified criterion, or to indicate that the data flow is being sent while a particular application is running on the UE.

Whichever network node or element is the first network node, the tagging command is sent to that first network node, for the tagging to be applied.

The statistics are then accumulated in a second network node. For example, when the base station is the first network node, a core network node can be the second network node.

Moreover, in each of the situations described herein, there may be more than one second node, in which the statistics are accumulated and reported back to a management node. Thus, while the tagging is applied in a first network node, the tags may be read in more than one second network node, with each of those second network nodes reading the tags, performing the required measurements, constructing the files containing the relevant statistics, and sending those files to the O&M node 18.

In each case, the tagging allows the statistics to be accumulated for a particular subset of the data flows, and then to be reported to the O&M node without requiring excessive network traffic.

The invention claimed is:

1. A method of monitoring a performance of a communications network, the method comprising:
   receiving by a core network node a request from a management node relating to a data flow property which is associated with one of a plurality of different types of user equipment or from an intermediate network node relating to a data flow identity which is associated with the one type of user equipment;
   receiving by the core network node a plurality of data flows passing through the core network node;
   checking by the core network node a user equipment identifier for each of the plurality of data flows passing through the core network node;
   determining by the core network node whether the user equipment identifier is associated with the data flow property or the data flow identity of the plurality of data flows;
   adding by the core network node a performance management identifier to each of the plurality of data flows determined to be associated with the data flow property or the data flow identity; and
   identifying by at least one base station data flows containing the same performance management identifier;
   aggregating by the at least one base station statistics relating to the identified data flows identified by the at least one base station; and
   reporting by the at least one base station the aggregated statistics to a management node of the communications network.

2. The method as claimed in claim 1 further comprising:
   receiving by the intermediate node a request from the management node relating to the data flow property;
   identifying by the intermediate node data flows having the data flow property; and signaling, to the core network node, information about the flow identity combined with a request to add the performance management identifier to the data flow with the data flow identity.

3. The method of claim 1, wherein where the intermediate network node is an IMS node.

4. The method of claim 1 where the core network node is a SGSN node.

5. The method as claimed in claim 1, wherein the reporting by the at least one base station the aggregated statistics to the management node of the communications network is performed in each of a plurality of base stations.

6. A method of operation of a base station in a communications network, the method comprising:
   receiving a plurality of data flows;
   detecting data flows containing a performance management indicator which is associated with one of a plurality of different types of user equipment, wherein the performance management identifier is added to the plurality of data flows by a core network node when a user equipment identifier of a data flow is associated with a data flow property, wherein the data flow property is associated with one of a plurality of different types of user equipment;
   aggregating statistics relating to the plurality of data flows containing the performance management indicator; and
   reporting the aggregated statistics to a management node of the communications network.

7. A method of operation of an intermediate network node in a communications network, the method comprising:
   receiving a request from a management node that a plurality of data flows should are to be identified which are all associated with one of a plurality of different types of user equipment;
   determining a performance management identifier that identifies the plurality of data flows which are associated with a user equipment identifier;
   signalling to a core network node identifying the determined performance management identifier to be added to the plurality of data flows which are associated with the one type of user equipment, wherein the determined performance management identifier is added to the plurality of data flows by the core network node when the user equipment identifier of a data flow is associated with a data flow property, wherein the data flow property is associated with one of a plurality of different types of user equipment; and
   signalling to at least one base station to initiate aggregating statistics relating to the plurality of data flows containing the performance management identifier.

8. A system in a communications network, the system comprising:
   an intermediate network node configured to:
      receive a request from a management node that a plurality of data flows should are to be identified which are all associated with one of a plurality of different types of user equipment;
      signal to a core network node that a performance management identifier should is to be added to the plurality of data flows which are associated with the one type of user equipment;
      signal to at least one base station to aggregate statistics relating to the plurality of data flows containing the performance management identifier,
   wherein the performance management identifier is added to the plurality of data flows by the core network node when a user equipment identifier of a data flow is associated with a data flow property, wherein the data flow property is associated with one of a plurality of different types of user equipment; and
   a base station configured to:
      identify data flows containing the same performance management identifier which is associated with the one type of user equipment;
      aggregate statistics relating to the identified data flows; and
      report the aggregated statistics to the management node of the communications network.

* * * * *